even, but a lower priority unit awaits its operands when a lower priority station is ready.

United States Patent Office 3,544,974
Patented Dec. 1, 1970

3,544,974
DATA PROCESSING SYSTEM INCLUDING BUFFERED OPERANDS AND MEANS FOR CONTROLLING THE SEQUENCE OF PROCESSING OF SAME
Kwang G. Tan, Wappingers Falls, N.Y., assignor to International Business Machines Corporation, Armonk, N.Y., a corporation of New York
Filed Apr. 1, 1968, Ser. No. 717,765
Int. Cl. G06f 3/04
U.S. Cl. 340—172.5        2 Claims

ABSTRACT OF THE DISCLOSURE

A data processing system has add units or reservation stations which collect operands for execution in an adder. A Start Control receives control signals and engages or starts the adder when the reservation stations are filled. The adder obtains operands from the reservation stations on a first-selected-and-ready, first-out basis. The main elements of the Start Control are a fill-up push-down stack for establishing priority of selection, and a priority circuit that starts the adder in response to signals from the stack and to control signals indicating a reservation station is filled and ready to deliver operands to the adder.

CROSS REFERENCE TO RELATED APPLICATION

Ser. No.: 579,082; filing date: Sept. 12, 1966; title: High Speed Adder; inventors: Robert E. Goldschmidt et al.

BACKGROUND OF THE INVENTION

This invention relates to data processing apparatus and, more particularly, to a control circuit for starting an execution unit that processes buffered operands in accordance with independent instructions.

While it will be apparent that my invention is not limited thereto, it is particularly useful in and will be described in connection with a data processing system of the type disclosed in the above-identified related application. The disclosed system is a large-scale, high-speed one having an execution unit designed to provide average execution rate of one instruction per machine cycle. To achieve this rate requires that many instructions be in various stages of processing at any one time. The instructions are decomposed into independent elements, as much as possible, so that execution proceeds regardless of the order of these elements.

In line with this philosophy, the system has a floating point execution unit provided with a two-stage, high-speed adder described in detail and claimed in said application. To use the adder efficiently, three reservation stations or add units receive, buffer or collect operands from a bus system. The add units may be selected, one per machine cycle, in random sequence. Each add unit receives one or two operands dependent on the associated instruction. When each add unit receives the appropriate number of operands, a unit full signal is generated indicating that the contents of the unit is ready to be processed by the adder.

Due to the nature of the system, it happens that the operands do not necessarily arrive, nor do the reservation stations necessarily become ready, in the same sequence as that in which the stations are initially selected. It also happens that two or three stations may be filled simultaneously. The stations are selected in an independent manner so the execution unit can proceed as soon as any station fills. Thus, some form of priority control is necessary.

Priority controls are known to exist in the prior art. The controls most applicable to the above system are believed to be either one which assigns a fixed priority to each station, or one which operates on a first-in first-out basis. However, both of these priority schemes are disadvantageous in that many machine cycles might be wasted while a high priority station awaits its operands when a lower priority station is ready.

SUMMARY

One of the objects of my invention is to provide a control for starting a data processing element in response to two sets of control signals, one set being a random sequence and the other set being random sequentially and simultaneously.

Another object is to provide a start control having a priority circuit for granting priority to an operating unit on a first-selected-and-ready, first-out basis.

Still another object is to provide a control for starting an execution unit that obtains operands from a plurality of reservation stations which are selected and which receive operands in random order.

A further object is to provide a start control having a priority scheme which avoids inefficient use of hardware due to a higher priority unit waiting while a lower priority element is ready to engage the hardware.

A still further object is to provide a plural position stack for establishing priorities according to the positions of the stack whereby a lower priority is increased as a higher priority is granted, and a lower priority may be granted when a higher priority is not ready to be granted.

Another object is to provide a stack establishing a variable priority which allows a lower priority to be granted out of turn while maintaining the relative values of any remaining priorities.

The foregoing and other objects, features and advantages of the invention will be apparent from the following more particular description of a preferred embodiment of the invention, as illustrated in the accompanying drawings.

DESCRIPTION OF PREFERRED EMBODIMENT

Figure 1:
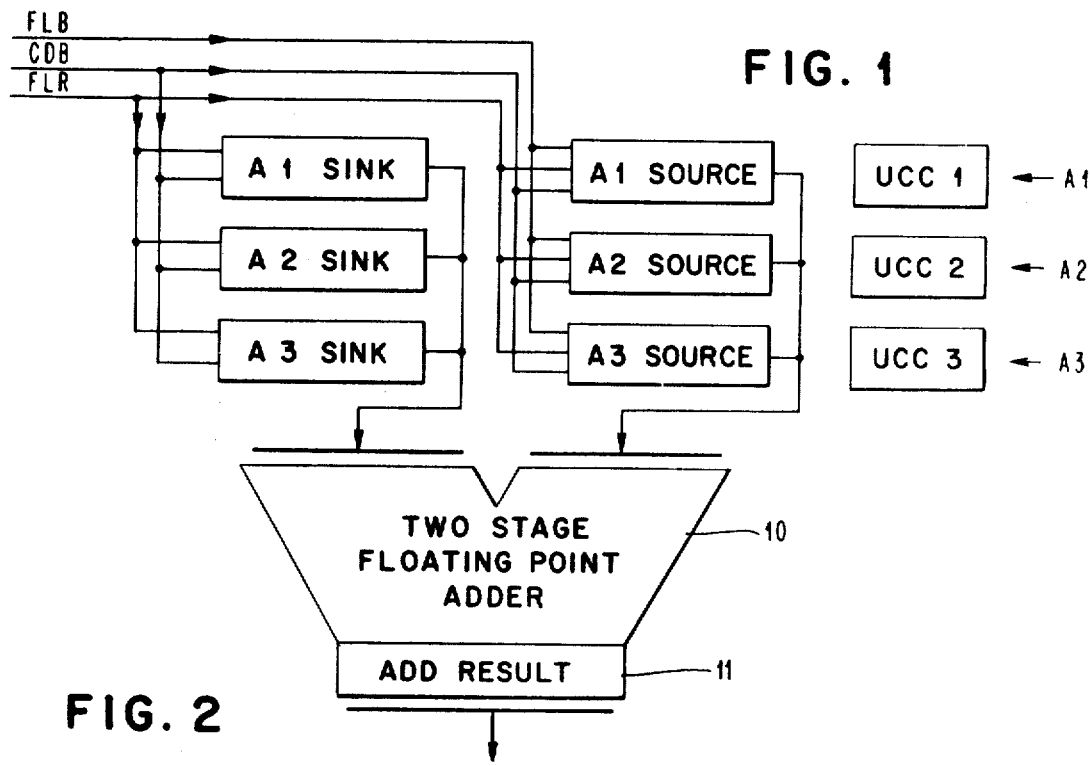
FIG. 1 is a block diagram of a portion of a data processing system in which use of the invention is particularly advantageous.
Figure 2:
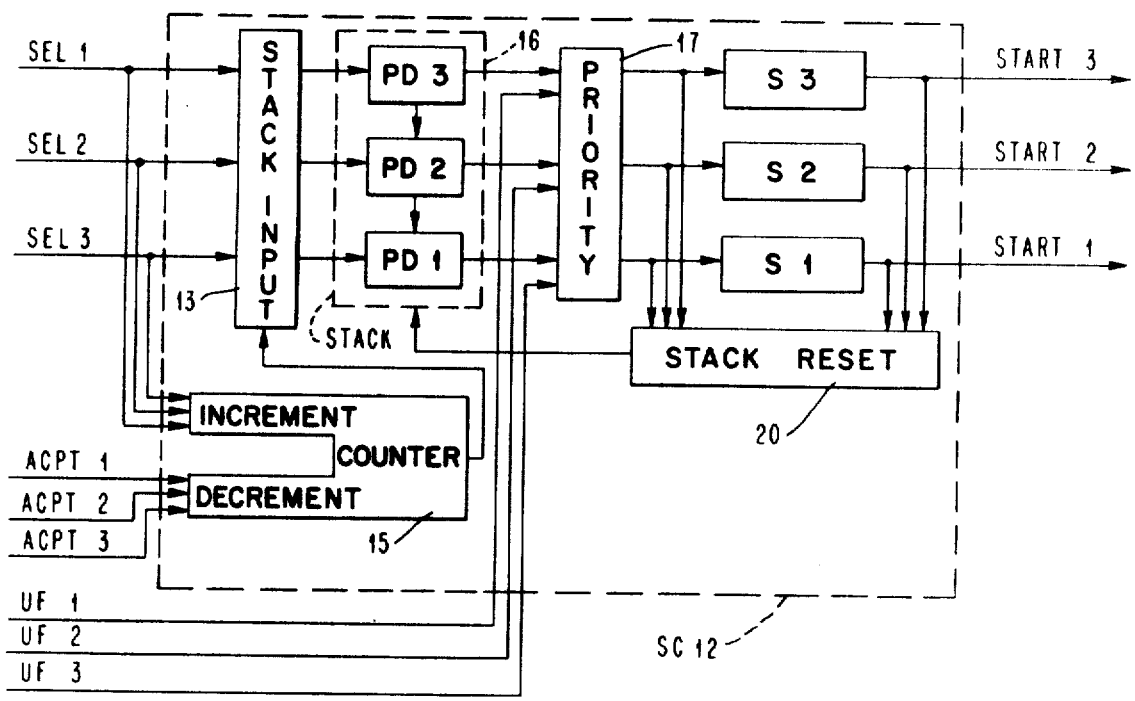
FIG. 2 is a block diagram of a Start Control embodying the invention.

The invention is illustrated in connection with the data processing system of the type disclosed in said related application, and in the related applications identified therein, to which reference may be had for a more detailed description. FIGS. 1 and 2 of the drawings herein, are derived from FIGS. 5 and 18A of said application.

Referring now to the drawings herein, and first to

FIG. 1, it will be seen that the data processing system includes a high-speed floating-point pipeline adder 10 that processes operands, in two stages on successive machine cycles, and places the results in an Add Result Register 11. Adder 10 requires two cycles for execution and is limited to one new input per cycle. Three reservation stations or add units A1, A2 and A3 receive the operands to be processed from busses FLR, FLB and CDB. Each add unit includes source and sink registers, for example A1 SINK and A1 SOURCE, and a UCC (Unit Communications Control). When the operands are available, control information is processed to cause the operands to be gated from the appropriate add unit registers into adder 10.

With reference to FIG. 2, the system also includes a SC (Start Control) 12. The system supplies SC 12 with select signals SEL 1–3, unit ready or full signals UF1–3, and accept signals ACPT 1–3. SC 12 provides the system with start signals START 1–3. As to the general structure and operation of SC 12, SC 12 has a stack input 13 which receives the select signals and, under the control of a counter 15, sets positions PD1–3 of a stack 16 to indicate the selected add units and to establish a priority criteria. Counter 15 has increment controls which respond to the select signals and step or increment the counter so as to cause successive select signals to set successively higher stack positions. Counter 15 also has decrement controls which respond to the accept signals and decrement counter 15 so as to cause a later received select signal to set the appropriate empty position PD of stack 16. Signals from stack 16 and the UF signals are fed to a priority circuit 17 so as to actuate start triggers S1–S3 and provide the start signals. A stack reset 20 responds to the signals for starting the units and provides signals for resetting stack 16 and pushing down unit designations from lower priority to higher priority positions.

EXPLANATION OF LOGIC SYMBOLS

Figure 3:
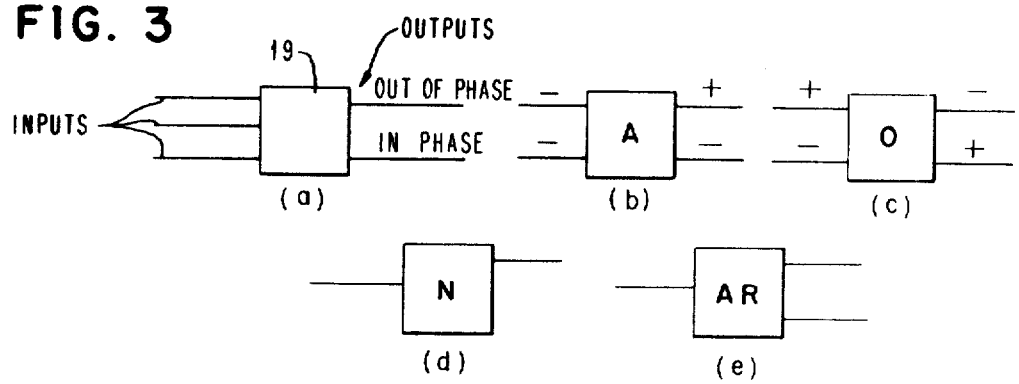
FIG. 3 illustrates the basic logic block used in the logic diagram.
Figure 5:
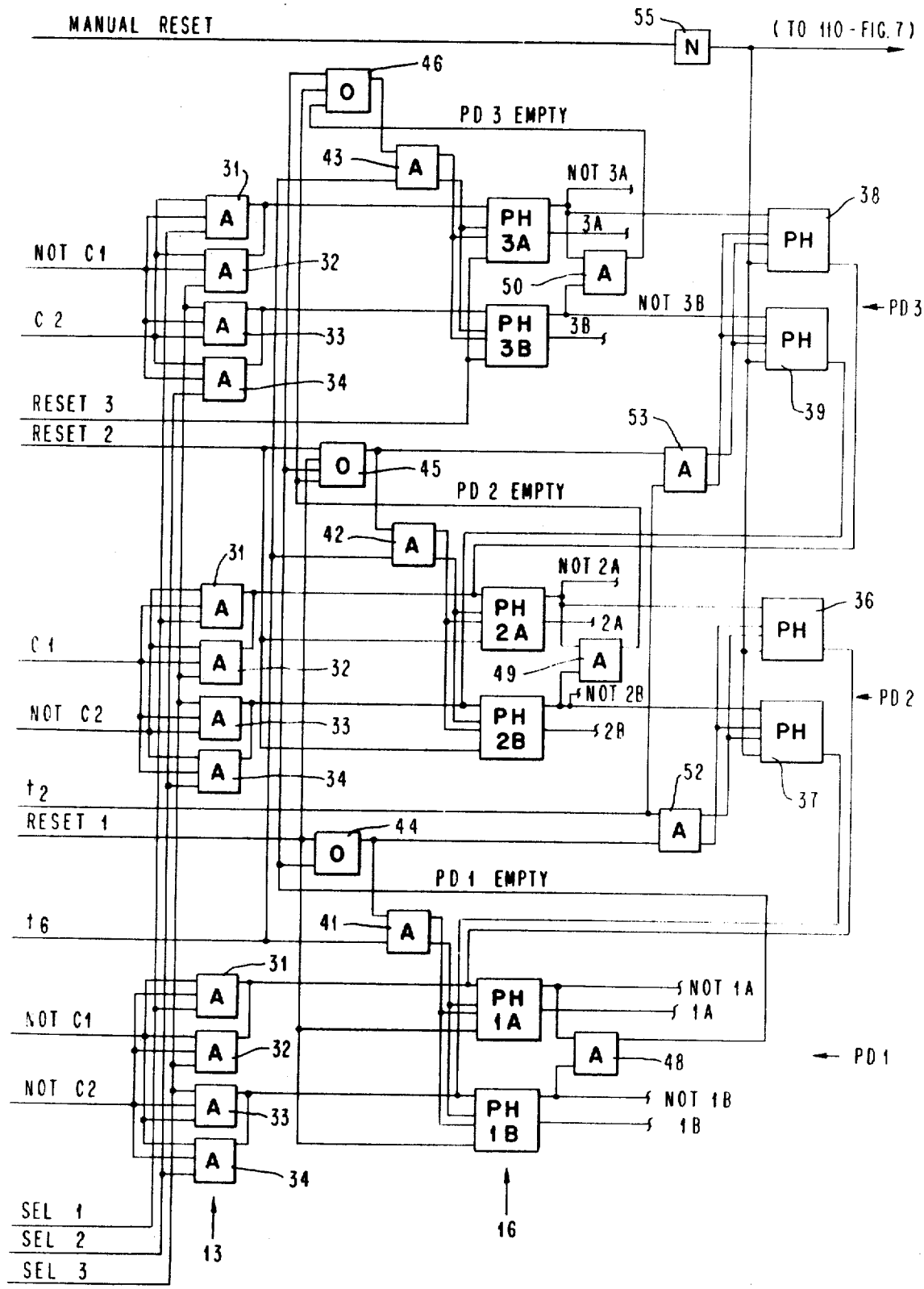
FIG. 5 is a logic diagram of the Stack Input and the Stack.
Figure 6:
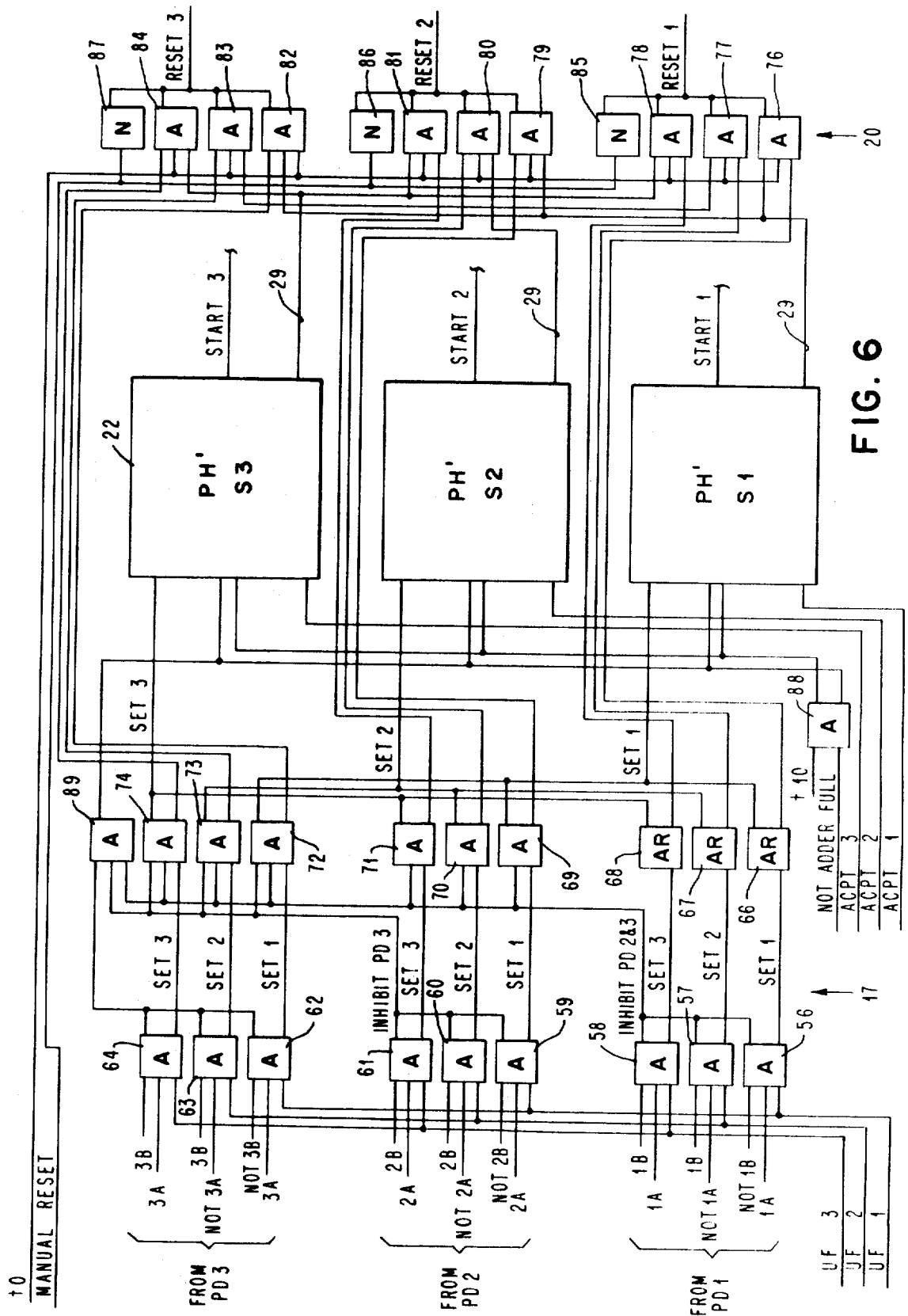
FIG. 6 is a logic diagram of the Priority, Stack Reset and Start triggers.
Figure 7:
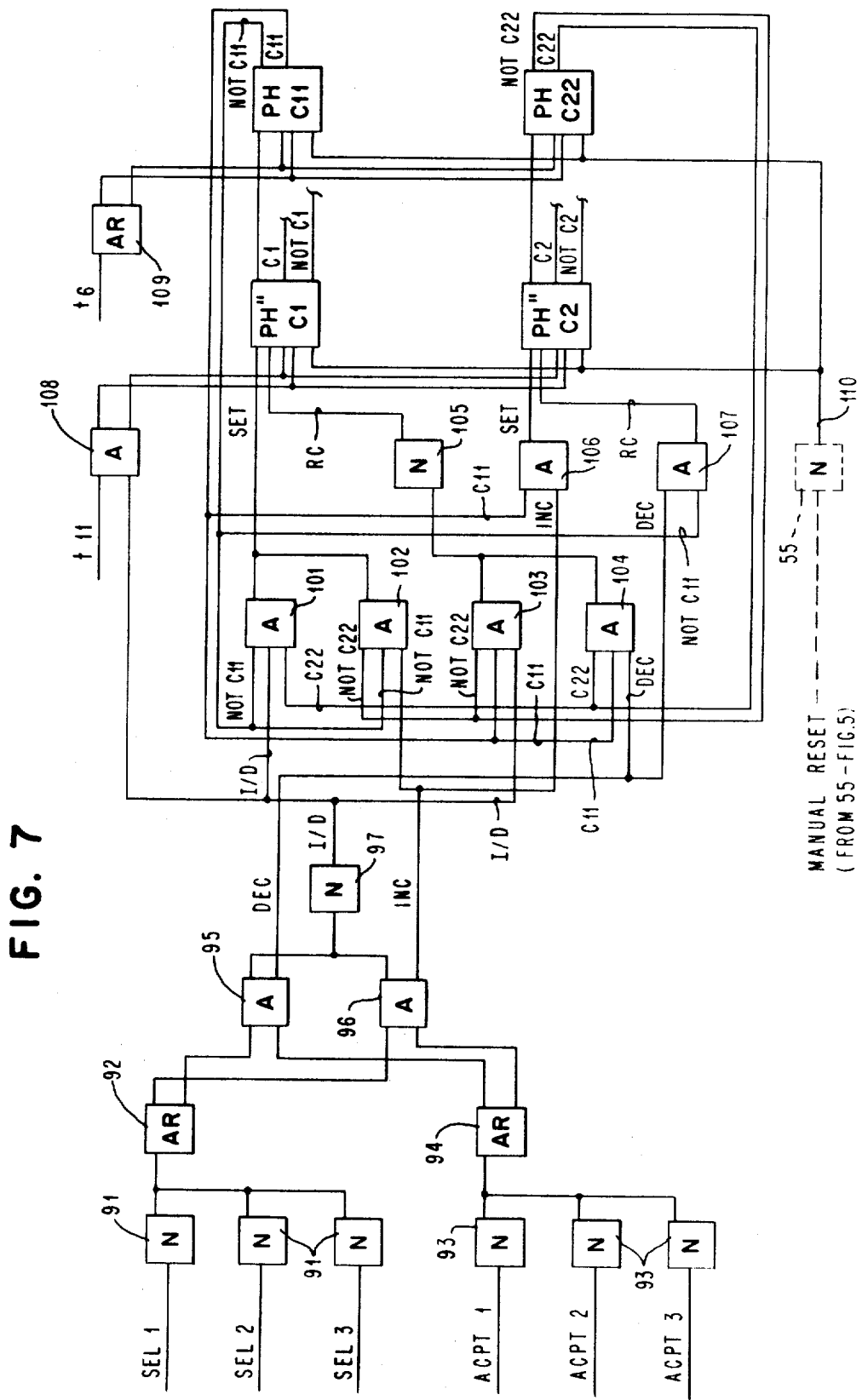
FIG. 7 is a logic diagram of the Counter.

FIG. 3 illustrates the logic symbology used in the logic diagrams of FIGS. 5–7. The same basic logic block 19 is used throughout the diagrams. With reference to (a), the block has three inputs on its left side and two outputs on the upper and lower right side. The upper and lower outputs are considered out-of-phase and in-phase respectively. Signals on the inputs and outputs are either at a more positive level or a more negative level, hereafter termed positive or negative or plus or minus. The logic of the block is as follows: if all inputs are minus, the lower or in-phase output is minus; and if any input is plus, the in-phase output is plus. The upper or out-of-phase output is the complement of the in-phase output. Dependent on the desired function, the block can have either one, two or three inputs and it can have either one or both outputs. Thus, with plural inputs, block 19 can be a negative AND circuit A (at b) or a positive OR circuit O (at c). With a single input, block 19 can be an inverter N (at d) or an amplifier AR (at e) providing complemented outputs. This logic is similar to that disclosed in said related application.

FIGS. 4(c), (d) and (e), show the symbols for three types of multi-block latches or polarity holds PH, PH' and PH" used in the logic diagrams. With reference to (a), each latch has three O's 22, 23 and 24, the upper outputs of which are wired or dotted together at 27 to provide a wired logic input to O25. This wired logic performs a negative dot AND function in that if all outputs from 22–24 are minus, the input to 25 is minus, or a positive dot OR function in that if any output is plus, the input to 25 is plus. In other words, in the wired logic function, the presence of a positive signal on any one of the lines feeding the wired logic overrides any negative signal. Each latch has four inputs identified by the name of the signal applied to it. A set input feeds O's 22 and 23 and complemented control inputs feed O's 22, 24, as shown. A feedback line 26 connects the upper output of O25 to inputs of O's 23 and 24. O22 functions to set the latch, O24 functions to hold the latch in a set state, and O23 prevents any transient conditions, arising when the control signals switch from active to inactive, from resetting the latch.

PH has one, two or three outputs. The upper and middle outputs of PH are taken from the upper and lower outputs of O25, and the lower output of PH is taken from the output of N28 whose input is connected to wired logic 27. Signals on the upper and lower outputs are of the same polarity.

FIG. 4(a), shows the polarities of the active signals associated with PH. PH can be set or switched from an inactive, reset or zero state by coincident active set and control signals. When PH is set, it can be reset by either a reset signal or by the control signals.

Figure 4:
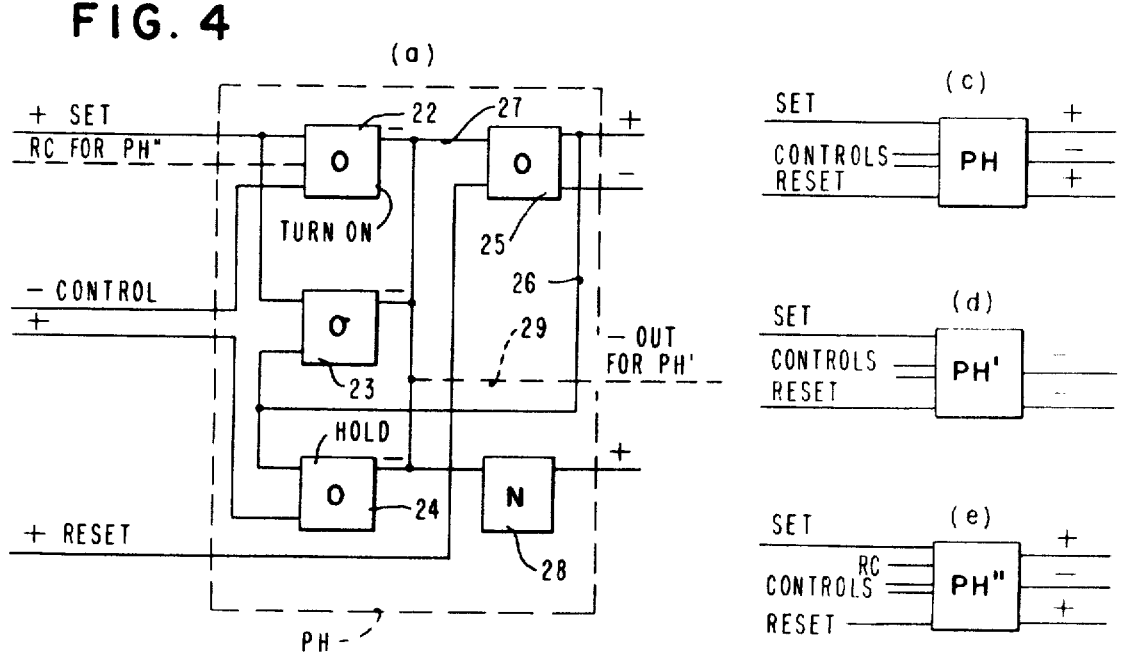
FIG. 4 illustrates the latch or polarity hold logic elements used in the logic diagrams.

The operation of PH will be explained with reference to the timing diagram at (b) in FIG. 4. At time 0, all the signals are inactive and PH is reset or inactive. In such state, the upper output of 25 is minus and this output when fed back to block 24, in conjunction with the minus lower control signal, causes the output of 24 to be positive and so that it, when applied to 25, holds the output of 25 negative so that PH is stable in the reset state. At 1, when a set signal becomes active, nothing happens because the output of 24 is still positive. When the control signals go active at 2, each of blocks 22–24 has a plus input so as to produce a negative output therefrom on 27. This negative output causes 25 to switch so the upper output becomes positive at 2. When the control signals go inactive at 3, and when the set signal goes inactive at 4, the feedback on 26 produces negative outputs from 22–24 so as to hold PH set. At 5, a plus reset signal applied to 25 satisfies the OR condition so that the upper output goes minus and thereby resets PH.

Times 6–8 show how control pulses may be used to reset PH. A set signal at 6 and control signals at 7 set PH. At 8, when the upper control lines go negative, in conjunction with the existing negative set line, the OR function O22 is not satisfied so that its output goes positive. This positive output on line 27 overrides the negative outputs from O's 23 and 24 causing O25 to switch whereby its upper output becomes negative. Such condition holds when the control signals become inactive.

The timing diagram FIG. 4(b), neglects any delays due to the time it takes a change in signals to transit a logic block 19. All of blocks 19 have the same delay. Thus, PH has a delay of two logic levels 22 and 25. PH' is used for start triggers S1–3 and it differs from PH by eliminating N28 and having in its place a line 29 connected to wired logic 27 and providing a fast output for PH': that is, relative to the lower output 29, PH' has a delay of only one logic level. Thus, a signal on 29 appears one logic level ahead of an output from 25.

Counter 15 uses two PH" which differ from a PH by the addition of a fifth input, an RC (reset control) input into O22 thereof. The RC input affects the operation in the following manner. PH" is set by coincident set and control signals and the polarity of the RC input is immaterial and has no effect on setting. If there is no set signal, a plus RC input signal, in conjunction with active control signals, will not set PH" because the output of 23 will be positive so as to hold PH" reset.

PH" can be reset by a reset signal, as above, or by use of active control signals in conjunction with a negative RC signal. To use the control signals to reset PH", the set input has to be inactive or negative. Then, when the RC signal is negative and the control signals become active, the three inputs to O22 will be negative so that it switches and produces a positive output that switches O25 to the reset state. PH" cannot be reset by use of control signals if the RC input is positive.

DETAILS OF SC 12

Stack input 13 has three series of gates 31–34 arranged in three stages corresponding to the stack positions. Stack input 13 also has lines for receiving the select signals SEL 1–3, the lines being designated by the name of the signal thereon. SEL 1 is applied as inputs to gates 31, SEL 2 is applied as inputs to gates 34, and SEL 3 is applied as inputs to gates 32 and 33 of all stages. Within each stage, the gates are conditioned by signals from counter 15 so as to cause a select signal to set stack 16 in accordance with the output of counter 15. Table 1 shows the code for setting the stack positions according to the counter, the zero being represented by the out-of-phase output from a clock PH'' as described in detail below. For example, in order to set PD1, the counter counts C1 and C2 are both 0. Thus, to condition the gates of the first stage, NOT C1 and NOT C2 signals are applied to condition each gate for setting PD1 in accordance with the particular select signal.

TABLE 1

| Clock counts | | Set stack position |
|---|---|---|
| C1 | C2 | |
| 0 | 0 | PD 1. |
| 1 | 0 | PD 2. |
| 0 | 1 | PD 3. |
| 1 | 1 | Stack full. |

TABLE 2

| Select signal | Stack code | | Add unit selected |
|---|---|---|---|
| | A | B | |
| SEL 1 | 1 | 0 | A1. |
| SEL 2 | 0 | 1 | A2. |
| SEL 3 | 1 | 1 | A3. |
| | 0 | 0 | None. |

The stack positions are divided into two stages, A and B, each having a PH storage device, for Example 1A or 1B, adapted to be set according to the stack code shown in Table 2 to designate the particular add unit selected by a given select signal. Such designation can be considered a two bit address for identifying a unit. In each stage of stack input 13, gates 31 and 32 have their upper outputs wired together as a set input to the associated A stage PH, and gates 33 and 34 have their outputs wired together as a set input to the associated B stage PH. A select signal, in conjunction with signals from the counter, causes stack input 13 to generate the unit address for setting the appropriate stack positions A and B to represent the add unit A1, A2 or A3 selected. For example, when the counter output C1 is active and represents a 1, and counter output NOT C2 is active and represents a 0, gates 31–34 of the second stage of stack input will be conditioned to enable a select signal to set PD2. For example, SEL 2 will satisfy the conditions of gate 33 to provide an active input signal to PH 2B, which, when the control signals are provided, will set PH 2B so that PD2 becomes set indicating unit A2 has been designated or selected.

A series of transfer latches or PH's 2AA, 2BB, 3AA and 3BB are provided as interposition storage devices for pushing down or transferring information from PD2 and PD3 to the next lower position. The set inputs of PH's 2AA and 2BB are connected to the upper outputs of PH's 2A and 2B and have their lower outputs connected to the set inputs of PH's 1A and 1B, respectively. Similarly, the set inputs of PH's 3AA and 3BB are connected to the upper outputs of PH's 3A and 3B and have their lower outputs connected to the set inputs of 2A and 2B, respectively.

A series of three control gates 41–43 each have both of their outputs connected as control inputs to PH's 1A and 1B, 2A and 2B and 3A and 3B, respectively. A timing signal t6 is applied to one input of each of gates 41–43 and these gates have a second input obtained from the output of condition blocks 44–46 which establish the conditions under which the control lines to the stack PH's become active during the timing signal t6. Blocks 44 and 45 also condition control gates 52 and 53 which receive a timing signal t2, for controlling the pushdown operations, as described more fully hereafter.

A series of three blocks 48–50 have two inputs connected to the upper outputs of PH's 1A and 1B, 2A and 2B, 3A and 3B, respectively, for providing output signals indicating that the respective stack positions are empty. The output of block 48 is fed to the inputs of blocks 44–46. Transfer block 44 also has a second input connected to respond to a RESET 1 signal. The RESET 1 signal is also applied directly to the reset inputs of PH's 1A and 1B and to the inputs of condition blocks 45 and 46.

Condition block 45, as previously indicated, has two inputs responding to RESET 1 and PD2 EMPTY signals. It also has two additional inputs responding to PD1 EMPTY and RESET 2 signals so that the four conditions PD1 EMPTY, or PD2 EMPTY or RESET 1 or RESET 2, activate the output of 45. Block 46 has three inputs responding to PD3 EMPTY, PD2 EMPTY, and PD1 EMPTY signals. The RESET 2 signal also is applied as a reset input to PH's 2A and 2B. A RESET 3 signal is applied directly to the reset inputs of PH's 3A and 3B.

Transfer control gates 52 and 53 have their output lines connected to the control inputs of the transfer latches. One input of each of gates 52 and 53 receives timing signal t2 to establish the time during which the transfer latches are set. A MANUAL RESET signal is applied through an inverter 55 to provide a master reset signal that is fed to the reset inputs of PH's 2AA, 2BB, 3AA and 3BB.

The RESET 1–3 signals are fed directly to the reset inputs of PH's 1A and 1B, 2A and 2B, and 3A and 3B, respectively, for resetting these latches after the units are started from such positions. The RESET 1 signal is also fed to O's 44 and 45 for transferring unit addresses into the transfer latches and for resetting the transfer latches after the addresses have been pushed down therefrom. The RESET 2 signal is applied to O45 for transferring the stack code into the transfer latches of PD3 and for resetting such latches after the stack code has been pushed down.

The PD1–3 EMPTY signals applied to O's 44–46, respectively, condition gates 41–43 so that the select signals can set the individual stack positions only when such positions are empty. The PD1 and 2 EMPTY signals also condition the gates so that the stack code can be pushed down into PD1 and PD2. The PD1 EMPTY signal fed to O's 45 and 46 also condition gates 42 and 43 for resetting PH's 2A and 2B, and 3A and 3B, respectively, after the stack code has been transferred from such positions. The PD2 EMPTY signal fed to O46 is used to reset PH's 3A and 3B.

Priority circuit 17 has nine selection gates 56–64 arranged in groups of threes to receive signals from each of the stack positions PD1–PD3 representing the address of a unit selected. Blocks 56, 59 and 62 respond to the address of A1 and these blocks also have inputs connected to receive UF1 signals. Similarly, blocks 57, 60 and 63 receive UF2 signals and the address of A2 and blocks 58, 61 and 64 receive UF3 signals and the address of A3. The lower outputs of blocks 56–64 are connected to the inputs of blocks 66–74. The upper outputs of blocks 56–58 are dotted together to form an input to priority gates 69–74 for inhibiting such gates from passing any signals from stack positions PD2 and PD3 when a unit is started from PD1. Similarly, the upper outputs of blocks 59–61 are dotted together to form an input for inhibiting blocks 72–74 when a unit is started from PD2.

The upper outputs of blocks 66, 69 and 72 are dotted to form an input to the set input of start trigger S1. Similarly, the outputs of blocks 67, 70 and 73 are wired to the set input of S2 and the upper outputs of blocks 68, 71 and 74 are wired to the data inputs of S3. The middle outputs of triggers S1–S3 provide START 1, START 2 and START 3 signals for use by the system in engaging or starting adder 10, and add units A1, A2 and A3.

The fast outputs of triggers S1–S3 are fed to the inputs of stack reset 20. Stack reset 20 has a series of gates 76–84 having first inputs connected to the lower outputs of blocks 66–74, respectively, for being conditioned in accordance with active signals therefrom. Each of blocks 76–84 also has a second input for receiving a timing signal $t0$. Blocks 76, 79 and 82 each have a third input connected to the output of trigger S1. Blocks 77, 80 and 82 each have a third input connected to the lower output of S2. Blocks 78, 81 and 84 each have a third input connected to the lower output of S3. The outputs of 76–78, 79–81 and 82–84 provide RESET 1–3 signals respectively. Thus, an active reset signal appears as a result of timing signal $t0$ and the activating of a start trigger, the reset signal being effective to reset the particular stack position containing the address of the unit started. Stack reset 20 also has three N's 85–87 each having an input that responds to the MANUAL RESET signal for simultaneously producing RESET 1–3 signals to reset PD1–PD3.

The ACPT1–3 signals are fed to the respective reset inputs of triggers S1–S3. The control line inputs to triggers S1–S3 are also connected to the output of a control gate 88 that has a timing input that responds to timing signal $t10$, and a condition input which responds to a NOT ADDER FULL signal, for producing the control signals for the start triggers. As adder 10 is a two-stage adder, the NOT ADDER FULL signal is derived by signals associated with the stages so that when adder 10 is full, gate 88 is disabled whereby the start triggers cannot be set.

The upper outputs of blocks 62–64 are dot wired to an input of a control gate 89. Gate 89 has a second input connected to the upper outputs of blocks 59–61 and a third input connected to the upper outputs of blocks 56–58. Thus, if none of the units is ready, as indicated by the lack of any UF signal, the inputs to 89 will be all negative so as to produce a positive output therefrom. This output is connected to the upper control line inputs to the start triggers.

FIG. 7 shows details of counter 15. With reference to this figure, select signals SEL 1–3 are fed to the inputs of the three N's 91 whose outputs are dot ORed to the input of AR 92. The accept signals are fed to the inputs of three N's 93 whose outputs are dot ORed to the input of AR 94. The upper output of AR 94 and the lower output of AR 92 are connected to the inputs of gate 95. Similarly, the upper output of AR 92 and the lower output of AR 94 are connected to the inputs of a gate 96. The upper outputs of blocks 95 and 96 are connected together to the input of N97. In operation, the presence of a select signal will switch the appropriate inverter 91 causing the outputs of AR 92 to become active. Should there be no accept signals, then both of the inputs to block 96 are active and the lower output thereof will provide an INC (Increment) signal for stepping up the counter. The upper output of block 96 will be inverted by 97 so as to also produce an I–D (increment or decrement) signal. Similarly, the presence of an accept signal at the input of an inverter 93 will switch AR 94 so that the inputs to block 95 are both active. The lower output of block 95 produces a DEC (decrement) signal whereas the upper output of 95 will be inverted by 97 to produce an I–D signal. The presence of simultaneous accept and select signals will switch both amplifiers 92 and 94, but the mutual switching will inhibit blocks 95 and 96 so that the counter is neither incremented nor decremented, the signals cancelling each other.

Counter 15 also includes PH'' C1 and PH'' C2 whose middle and lower outputs respectively provide C1 and NOT C1 and C2 and NOT C2 signals that are used to control stack input 13, as previously described. The upper outputs of PH''s C1 and C2 are fed to the set inputs of PH's C11 and C22, the upper and middle outputs of which respectively provide NOT C11 and C11 and NOT C22 and C22 signals for use by the counter's logic section. The control inputs of PH'' C1 and PH'' C2 are connected to the outputs of a control gate 108 that is conditioned by a $t11$ timing signal and by the I–D signal. Thus, PH''s C1 and C2 are set and reset, at $t11$ time, in accordance with signals on the set and RC inputs thereof. The control inputs of C11 and C22 are connected to the outputs of AR 109 which receives a $t6$ signal for setting and resetting C11 and C22 in accordance with the signals on the set inputs thereto, i.e., in accordance with the conditions of C1 and C2. The reset inputs of C1, C11, C2 and C22 are connected by line 110 to N55 (FIG. 5) so that a MANUAL RESET signal is effective to reset counter 15.

Counter 15 also includes a logic section comprising blocks 101–107 providing set and RC signals to C1 and C2. Blocks 101 and 102 have their upper outputs dot ORed to the set input of C1. The inputs of blocks 101 are activated by NOT C11, I–D, and C22 signals which cause the output of 101 to be positive and thereby provide a set signal for C11. The inputs of 102 are responsive to NOT C22, NOT C11 and INC signals for providing another set C1 signal during the presence of the conditions represented by the active signals.

The RC input of C1 is connected to the output of an inverter 105 whose input is dot ORed to the outputs of blocks 103 and 104. The inputs of block 103 are responsive to NOT C22, C11 and I–D signals for providing an output which, when inverted by 105, provides an RC input to C11. The inputs of 104 are activated by C22, C11 and DEC signals.

The set input of C2 is connected to the upper output of block 106 whose inputs respond to C11 and INC signals. The RC input of C2 is connected to the lower output of 107 that is activated by DEC and NOT C11 signals.

Thus, in accordance with the state of C1 and C2, which C11 and C22 follows at $t6$ time, the logic section of counter 15 steps C1 and C2 up and down, in accordance with the receipt of the select and accept signals, to provide the counts necessary for controlling the stack input. When the stack is full, that is both C1 and C2 are set, such condition can be sensed by the system, outside of SC 12, to provide a signal inhibiting any further select signals from being sent until such time as a stack position becomes available.

EXEMPLARY OPERATION

To illustrate the basic principles of operation of the invention, three examples will be described with reference to the timing diagrams in FIGS. 8–10. The first example involves what happens when a single unit is selected. Example 2 involves a series of three consecutive selections, where the unit full signals follow the select signals in the shortest possible time, the example not involving any priority nor pushdown. Example 3 involves a series of three consecutive select signals where the unit full signals arrive concurrently. This example involves a priority determination and a pushdown operation of the stack. Each example will start and end with the stack 16 being empty and counter 15 being set to control stack input 13 to point to PD1. In the timing diagrams, each machine cycle is broken down into twelve time intervals, $t0$–$t11$, each interval corresponding to the delay encountered in passing a signal through a single logic block or level. A numeric suffix is used at a time interval within a given machine cycle. Each timing signal lasts three intervals.

Figure 8:
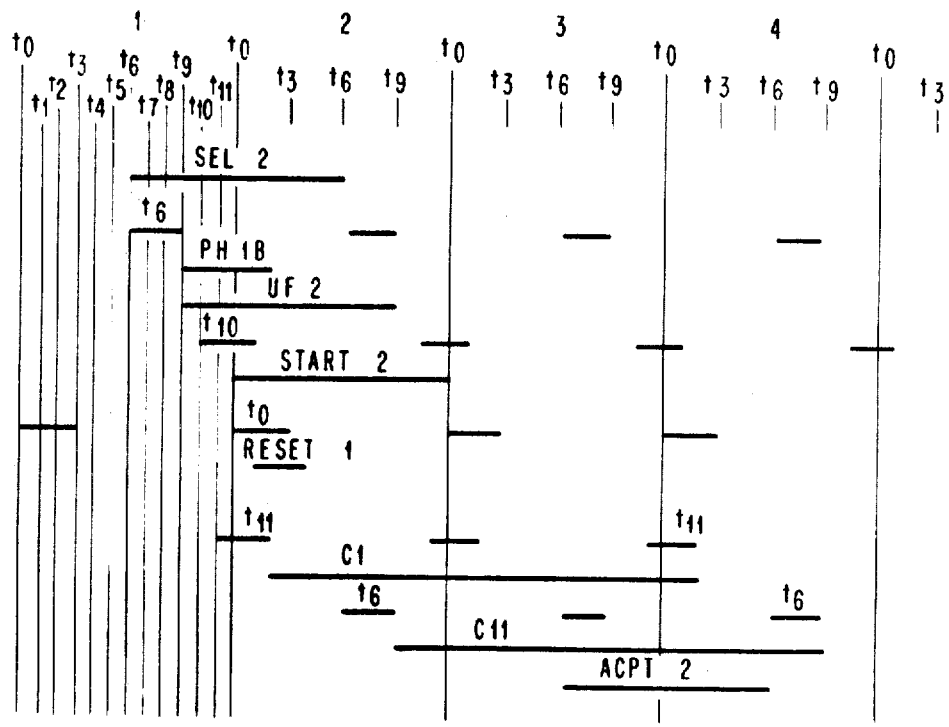
FIG. 8 is a timing diagram for a first example of operation of the invention.

Referring now to FIG. 8, a SEL 2 signal is provided by the system at time *t*6–1 and this signal remains for one machine cycle. SEL 2 activates block 34 causing its output to become active, one interval later, and thereby activate the set input of PH1B. Gate 41 is activated by timing signal *t*6 and by an output from 41 caused by the PD1 EMPTY signal. The coincidence of the control signals from block 41, and the set signal from 34, sets PH1B so that at a time delay of two intervals, due to the signals passing through blocks 22 and 25 thereof, the output of PH1B becomes active. Thus, PD1 is set with the address of unit A2.

The earliest that a unit full signal can arrive is at *t*9 of the same machine cycle in which the select signal arrives. Thus, in this example, the UF2 signal is applied to priority circuit 17 at at time *t*9–1 and this signal remains for one cycle. The coincidence of the UF2 and the PD1 signals, NOT 1A and 1B, on block 57, activates AR 67 so as to provide a set signal to PH′ S2. A timing signal *t*10 is applied to gate 88 and it, in conjunction with the NOT ADDER FULL signal, activates gate 88 to produce control signals for PH′ S2. The coincidence of the set signal and control signals occurs at time *t*11 so that a START 2 fast signal appears on line 29 of PH′ S2 at time *t*0–2. At time *t*0–2, signal *t*0 is applied to the gates of stack reset 20 and this signal, in conjunction with the signals on line 29 of PH′ S2 and on the lower output of AR 67 activates block 77 to provide RESET 1 signal. RESET 1 signal appears at *t*1–2 time and lasts for three intervals. The RESET 1 signal is applied directly to the reset inputs of PD1 so that PH1B is reset one time interval later, due to the fact that the signal only has to travel through the block 25 thereof, at *t*2–2.

With regard to the operation of counter 15, SEL 2 signal activates N91, AR 92, A96, and A102 to provide set signal to PH″ C1, the set signal becoming active at *t*10–1. Timing signal *t*11, applied to gate 108, in conjunction with the I–D signal coming out of inverter 97, due to the presence of the select signal, activates the control inputs of C1 so that the clock signals C1 and NOT C1 (not shown) become active at *t*2–2. This conditions the inputs of stack input 13 to point to PD2. Timing signal *t*6 appears at *t*6–2 and it activates control AR 109 to activate the control lines to C11 at time *t*7–2. Since at this time, the output of C1 is also active, C11 sets and provides an active C11 signal at *t*9–2.

Next, at time *t*6–3, the system provides the ACPT 2 signal which lasts for one cycle. This signal, acting on the counter through N93, AR 94, A95 and N97 satisfies the conditions on block 103 for resetting PH″ C1. That is, the output N105 is applied to the RC input of PH″ C1. Since block 108 is also partially activated by the I–D signal, the timing signal *t*11 applied thereto causes the control lines to PH″ C1 to become active at *t*0–4. Since both the RC and set inputs thereto are then negative, PH″ C1 resets at *t*2–4. Consequently, at time *t*7–4, when the control lines to PH C11 become active, there is no set signal and therefore C11 resets at *t*9–4 due to the resetting action of the control inputs. This resetting, in effect, decrements counter 15 so as to recondition stack input 13 to point to the lowest position of stack 16. At this point, SC 12 is restored to the condition existing at the beginning of the example.

Figure 9:
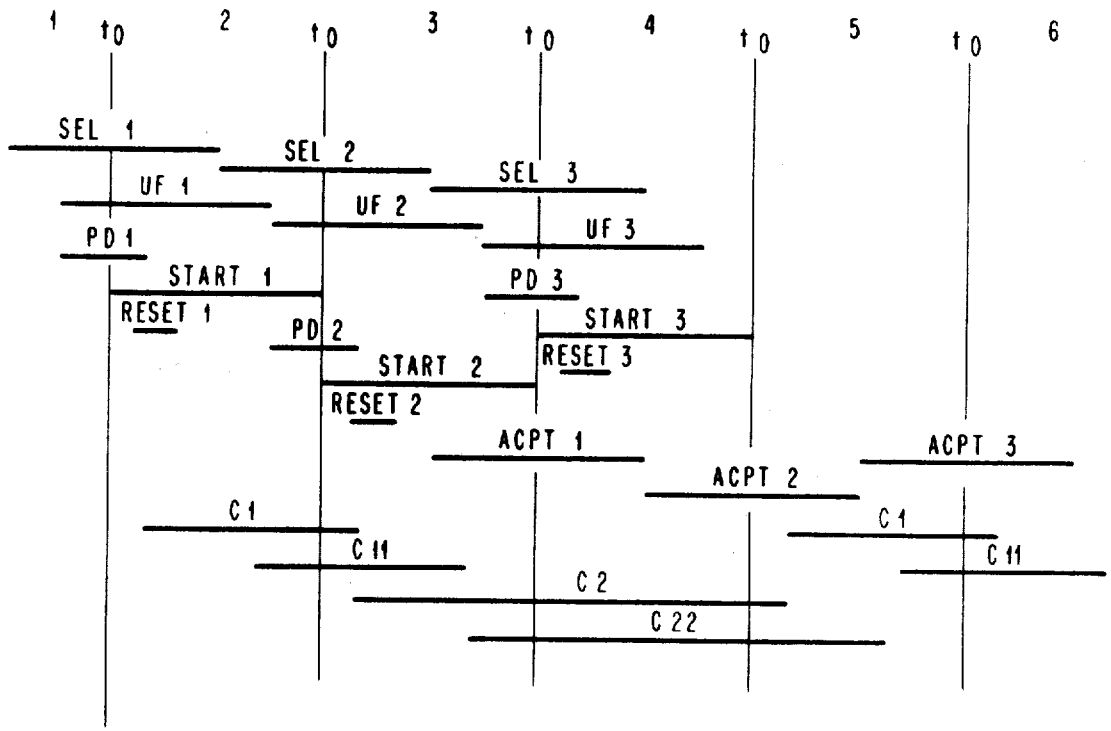
FIG. 9 is a timing diagram for a second example of operation of the invention.

Example 2 is illustrated in FIG. 9. In this figure the timing signals have been omitted for simplicity and the description is not done on a block by block basis, as in Example 1, but is more generalized to facilitate an understanding of the overall operations. A series of select signals SEL 1, SEL 2 and SEL 3 appear on successive machine cycles 1, 2 and 3 at times *t*6 thereof. Unit full signals UF1, UF2 and UF3 also will appear on successive machine cycles 1–3 at times *t*9 thereof. At *t*9–1, PD1 will be set with the address of unit A1. The UF1 and PD1 signals, acting on priority circuit 17, activate the PH′ S1 at *t*0–1 to provide a START 1 signal that activates stack reset 20 to produce a RESET 1 signal that resets PD1. The SEL 1 signal applied to counter 15 sets C1, in the manner previously described, and this, in turn, sets C11. At *t*6–2, when the SEL 2 signal becomes active, the position PD2 is set indicating unit A2 is selected. Therefore, with UF2 and PD2, a START 2 signal appears throughout the third machine cycle, followed by a RESET 2 signal which resets PD2.

The SEL 1 signal increments counter 15 to produce the C1 and C11 signals as previously described. Due to SEL 2 signal, counter 15 is again incremented so that at *t*2–3, C1 is reset and C2 is set so as to point to stack position PD3. Due to the absence of a C1 signal at its clocking or gating time, C11 is reset at *t*8–3. Thus, when the SEL 3 signal arrives, it sets PD3 indicating unit A3 is selected. However, in the third cycle, both the ACPT 1 and the SEL 3 signals are concurrent so that counter 15 remains the same and C2 and C22 hold for an additional cycle. However, the ACPT 2 signal decrements counter 15, so that in cycle 5, C2 is reset and C1 is set. Finally, the ACPT 3 signal decrements counter 1 by resetting PH″ C1 at *t*2–6. PH's C22 and C11 are reset at *t*5–8 and *t*6–8 due to the lack of C2 and C1 signals at such times, so that at *t*8–6, the system is finally restored to its beginning condition.

Figure 10:
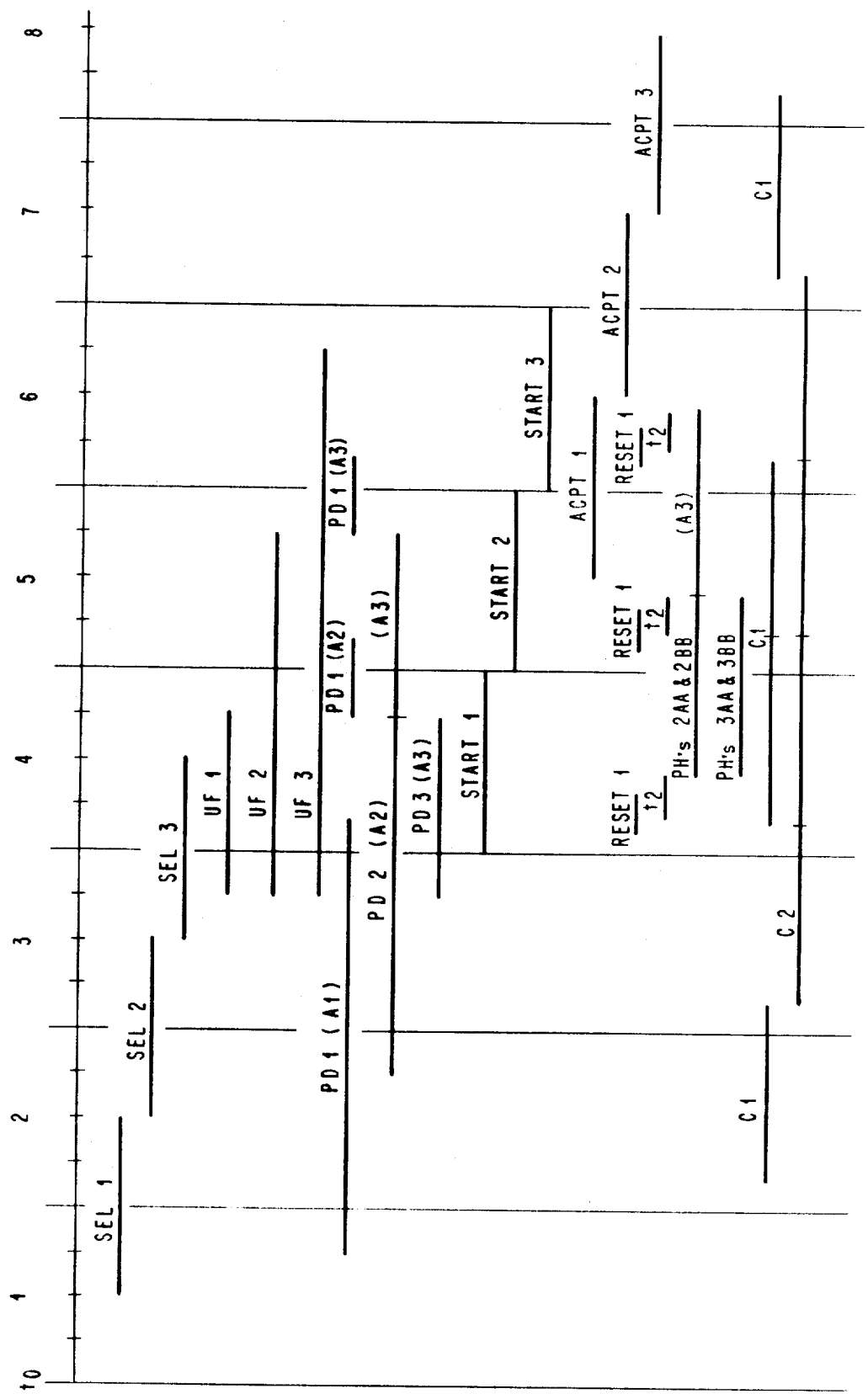
FIG. 10 is a timing diagram for a third example of operation of the invention.

With reference to FIG. 10, in Example 3, select signals SEL 1, 2 and 3 are received on successive machine cycles 1–3, and three unit full signals UF1–3 are received simultaneously at *t*9–3, indicating that each of the add units is ready to engage the execution unit. With the counter initially sitting on zero, SEL 1 signal will set PD1 to indicate that unit A1 is to be selected. The SEL 1 signal increments the counter to point to position PD2. Thus, when SEL 2 arrives, PD2 is set to indicate that unit A2 is selected thereby. The SEL 2 signal increments the counter again to point to PD3 whereby the SEL 3 signal will set PD3 to indicate that unit A3 is selected. The SEL 3 signal also increments the counter so that both C1 and C2 are active thereby preventing any further select signals from being sent to the SC 12. In cycle 3, the presence of UF1 signal plus the appropriate stack code which operates on block 56, produces a set signal for PH′ S1. The upper output of block 56 becomes active and inhibits blocks 69–74 whereby priority is granted to set PH′ S1, in accordance with the code in PD1. The RESET 1 signal, arriving at *t*1–4, resets PD1.

At this point, the operation departs somewhat from that described in the previous examples in that the RESET 1 signal is also used to push down the stack, the pushdown being accomplished by the use of the timing signal *t*2. With reference to FIG. 5, RESET 1 conditions block 44 to activate one input to control gate 52. Signal *t*2 activates the other input to gate 52 so that at time *t*3–4, the control inputs to PH's 2AA and 2BB become active. In conjunction with the set signal of the stack code in PH's 2A and 2B, PH 2AA and PH 2BB are set to indicate unit A2. The RESET 1 signal also conditions O45 to condition control gate 53. Thus, timing signal *t*2 sets PH's 3AA and 3BB in a manner similar to that by which PH's 2AA and 2BB are set, in accordance with the stack code in PH's 3A and 3B to indicate that unit A3 is selected. As previously indicated, the outputs of the transfer latches are fed to the inputs of PH's 1A, 1B, 2A and 2B, respectively. Since PD1 is empty at this point, the PD1 EMPTY signal conditions gates 41 and 42, via blocks 44 and 45, as previously described, so that at *t*6 the unit selections are transferred or pushed down from PH 3AA and PH 3BB and PH 2AA and PH 2BB into PH's 2A, 2B, 1A and 1B, respectively, to thereby increase the priorities of these units while maintaining their priorities relative to each other. Thus, PD1 is set to indicate that unit A2 is now selected thereby and PD2 is set to indicate that A3 is selected. Therefore, in cycle 4, the coincidence of the PD1 signal and the UF2 signal at *t*9–4 activates PH′ S2 to provide the START 2 signal in cycle 5.

The START 2 signal in conjunction with the signal from AR 67, produces a RESET 1 signal during cycle 5. This signal first resets PD1 and then, in conjunction with signal *t*2, causes the stack code to be transferred first into PH's 2AA and 2BB. Then, in the manner previously described, the stack code is used to set PD1, at *t*9–5, to indicate unit A3 is selected. In cycle 5, the presence of the PD1 signal and UF3 signal at *t*9 produces the START 3 signal in cycle 6. The accept signals ACPT 1–3 follow the start signals, cycles 5, 6 and 7, so as to decrement the counter until counter 15 becomes set during cycle 8 to point to PD1.

As the stack code is pushed down, let us now consider how the upper positions from which the code is transferred are reset. It is to be recalled that PD1 initially resets at *t*2–4 and the PD1 EMPTY signal at *t*3–4 is applied to block 46. The output of block 46 activates one line of control gate 43. At *t*6–4, the control lines to PH's 3A and 3B become active. Since at this point, the set lines thereto are inactive, the PH's 3A and 3B are reset. Thus, during cycle 7, when the control lines to PH's 3AA and 3BB become active, the absence of active signals on their set inputs resets these PH's. As to resetting PD2, this occurs in a similar manner during cycle 5, due to the fact that the control lines input to PH's 2A and 2B are rendered active due to the *t*6 signal and PD1 EMPTY signal, while the set inputs are inactive, so that the PH's 2A and 2B are reset. During cycle 6 therefore, PH's 2AA and 2BB are reset, when their control lines input becomes active, due to the absence of a set input thereto from PH's 2A and 2B. It should be apparent then that with PD3 empty and counter 15 decremented to point to PD3, additional select signals can be received beginning in cycle 6.

The foregoing example were selected to provide a better understanding of the operation of the invention. It should be apparent that many variations will occur in the operation dependent primarily upon the number of instructions being executed, the time during which the instructions are executed, and the time during which the add units have to wait for the operands to arrive before the unit ready or full signals are generated. As exemplary of the many variations, it may be that the select signals do not arrive on successive cycles, but that there is a gap of one or more cycles between the successive select signals. The stack is filled up dependent upon the order of receipt of the select signals, but it can be emptied in the completely reverse order or by a combination. For example, assume as the stack fills up that the unit in PD2 becomes ready and starts. After PD2 resets, the stack code in PD3 can be pushed down. This action not only maintains the relative priority between the units designated in PD1 and PD3, but it increases the priority of PD3, when the designation is set into PD2, relative to any later received signals. In general, it might be stated that as a stack is filling up, if the select and unit full signals are received in the same machine cycle, then the unit designated thereby may be started on the next machine cycle, but if the unit full signal does not arrive on the same machine cycle, i.e., there is a waiting factor, or if there is another unit having a higher priority, then the stack may be involved with a pushdown operation as lower positions are emptied.

While the invention has been particularly shown and described with reference to a preferred embodiment thereof, it will be understood by those skilled in the art that various changes in form and details may be made therein without departing from the spirit and scope of the invention.

What is claimed is:
1. A data processing system comprising:
an execution unit for processing data;
a plurality of data busses for transmitting data;
a plurality of buffers;
selectively operable connecting means selectively connecting each of said buffers to at least one of said busses;
means for supplying select signals to said selectively operable connecting means for causing said buffers to receive data from said busses;
signal means responsive to the filling of any of said buffers with data for supplying ready signals, each ready signal indicating that a buffer is filled and is ready to transfer data to said execution unit;
means operative, in response to said select signals, to generate the addresses of the buffers selected thereby;
a plurality of successive storage means for storing said addresses;
means responsive to said select signals for establishing buffer priorities in accordance with the order in which said select signals caused each of said buffers to receive data;
means responsive to said select signals for filling successive ones of said storage means with addresses in accordance with the order of receipt of said select signals;
start means jointly responsive to said ready signals, said addresses and said buffer priorities for selectively starting transfer of data from a selected buffer to said execution unit, whereby transfer from a later selected but earlier ready buffer is started ahead of an earlier selected buffer, said start means starting transfer in accordance with said buffer priorities when two buffers are both ready to start;
means responsive to the starting of transfer of data from one of said buffers for resetting the storage means associated with said one of said buffers, thereby destroying the buffer priority of said buffer while maintaining the relativity of any remaining buffer priorities; and
means responsive to the resetting of one of said storage means for transferring any remaining buffer address which had a lower buffer priority to a storage means having a higher buffer priority.

2. A data processing system comprising:
an execution unit for processing data;
a plurality of reservation stations competing for use of said execution unit;
means supplying random serial select signals for selecting a reservation station;
means responsive to a reservation station being ready to use said execution unit for supplying a ready signal;
priority means responsive to said select signals for establishing reservation station priorities based upon the order of receipt of said select signals;
a stack having successive storage positions settable for indicating which station is to use said execution unit;
stack input control means comprising counter means responsive to said select signals for controlling the setting of said storage positions in a descending order based upon said established reservation station priorities;
ready indicating means for receiving said ready signals;
start means associated with said reservation stations for selectively engaging said reservation stations to said execution unit;
means jointly responsive to said priority means and said ready indicating means for actuating said start means to engage said reservation stations to said execution unit on a first-selected-and-ready first-out basis;
means responsive to actuation of said start means for resetting the storage position which indicates the priority of the reservation station engaging said execution unit so as to maintain the relativity of any remaining priorities;
execution indicating means for supplying an engage signal indicating that a reservation station has been engaged to said execution unit;

means for causing said counter means to increment in response to one of said select signals and to decrement in response to said engage signal so as to keep track of set and reset storage positions of said stack; and means responsive to the resetting of a storage position for increasing the priority of any reservation station having a lower priority.

References Cited

UNITED STATES PATENTS

| | | | |
|---|---|---|---|
| 3,058,659 | 10/1962 | Demmler et al. | 340—172.5 |
| 3,274,554 | 9/1966 | Hopper et al. | 340—172.5 |
| 3,293,616 | 12/1966 | Mullery et al. | 340—172.5 |
| 3,456,244 | 7/1969 | Seichter et al. | 340—172.5 |

OTHER REFERENCES

IBM 7080 Data Processing System Reference Manual, A22-6560-1, 1960-61 (pp. 6, 7, 10-19, 25-29, 58 and 59).

IBM 7080 General Logic and Data Flow Handbook, 1960 (FIGS. 2.3-1, 2.4-1, 10C and 128).

PAUL J. HENON, Primary Examiner

H. E. SPRINGBORN, Assistant Examiner